(12) United States Patent
Suttles

(10) Patent No.: US 10,316,878 B2
(45) Date of Patent: Jun. 11, 2019

(54) LOCKBOLT COLLAR FEED MECHANISMS, LOCKBOLT INSTALLATION TOOLS, AND METHODS OF INSTALLING LOCKBOLT ASSEMBLIES

(71) Applicant: The Boeing Company, Chicago, IL (US)

(72) Inventor: Johnny Smith Suttles, Charleston, SC (US)

(73) Assignee: The Boeing Company, Chicago, IL (US)

( * ) Notice: Subject to any disclaimer, the term of this patent is extended or adjusted under 35 U.S.C. 154(b) by 143 days.

(21) Appl. No.: 15/262,941

(22) Filed: Sep. 12, 2016

(65) Prior Publication Data

US 2018/0073539 A1 Mar. 15, 2018

(51) Int. Cl.
| | | |
|---|---|---|
| *F16B 19/05* | (2006.01) | |
| *F16B 39/284* | (2006.01) | |
| *B23P 19/00* | (2006.01) | |
| *B21J 15/02* | (2006.01) | |
| *B21J 15/10* | (2006.01) | |
| *B21J 15/32* | (2006.01) | |

(52) U.S. Cl.
CPC .............. *F16B 19/05* (2013.01); *B21J 15/022* (2013.01); *B21J 15/105* (2013.01); *B21J 15/32* (2013.01); *B23P 19/002* (2013.01); *F16B 39/284* (2013.01)

(58) Field of Classification Search
CPC ......... F16B 19/05; F16B 39/284; B21J 15/32; B21J 15/105; B21J 15/022; B23P 19/002
See application file for complete search history.

(56) References Cited

U.S. PATENT DOCUMENTS

| | | |
|---|---|---|
| 2,114,493 A | 4/1938 | Huck |
| 2,531,048 A | 11/1950 | Huck |
| 4,852,376 A | 8/1989 | Suhov |
| 2016/0167108 A1 | 6/2016 | Godfrey et al. |

FOREIGN PATENT DOCUMENTS

WO    WO 89/02798    4/1989

OTHER PUBLICATIONS

European Patent Office, Extended European Search Report for related European Application No. 17190466, dated Feb. 2, 2018.

*Primary Examiner* — John C Hong
(74) *Attorney, Agent, or Firm* — Dascenzo Intellectual Property Law, P.C.

(57) ABSTRACT

Lockbolt collar feed mechanisms, lockbolt installation tools, and methods of installing lockbolt assemblies are disclosed. Lockbolt collar feed mechanisms comprise a collar cartridge and a mounting bracket operatively coupled to the collar cartridge and configured to be operatively coupled to a lockbolt installation tool. The collar cartridge has a delivery position, in which an exit port is positioned to position a lockbolt collar forward of the lockbolt installation tool's anvil, and a retracted position, in which the collar cartridge is pivoted and translated rearward relative to the delivery position. The collar cartridge is biased toward the delivery position and moves from the delivery position to the retracted position responsive to a user urging the lockbolt installation tool and the lockbolt collar feed mechanism toward and into engagement with a workpiece.

30 Claims, 5 Drawing Sheets

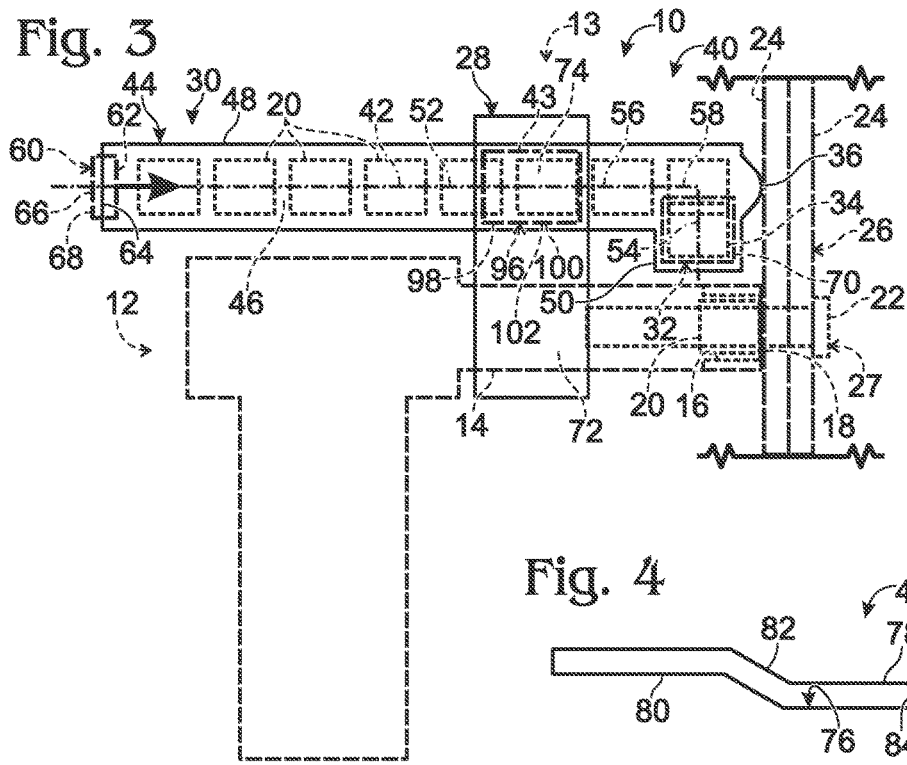
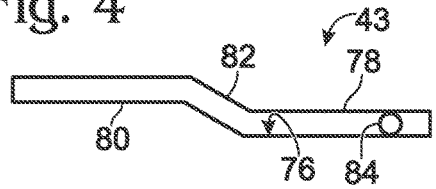
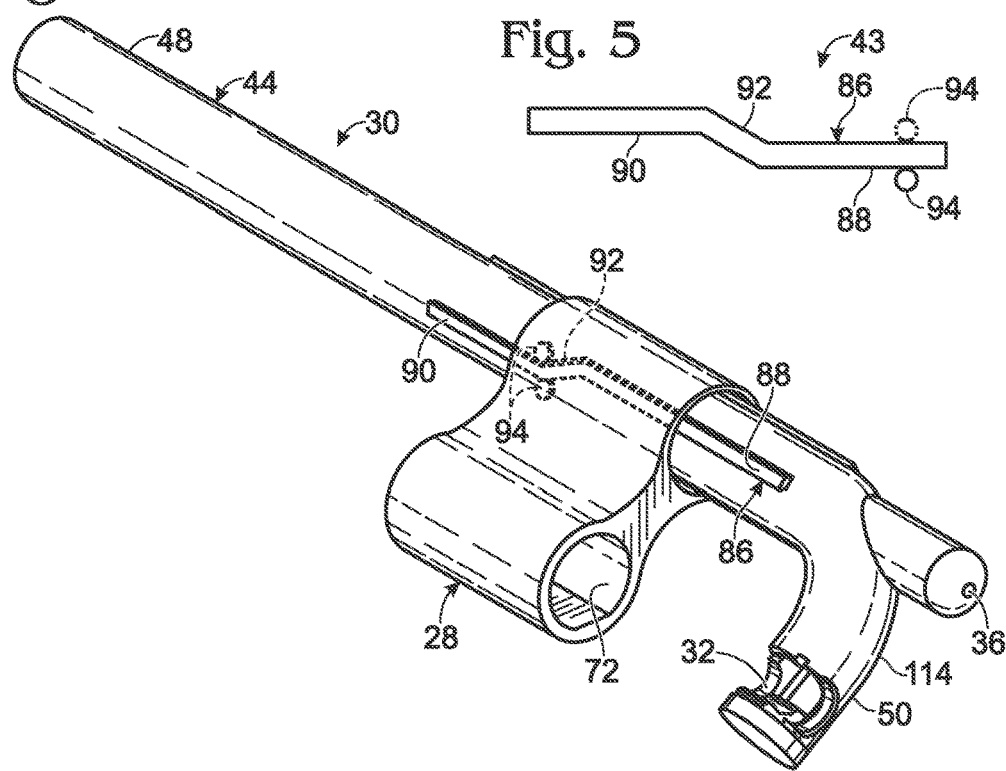

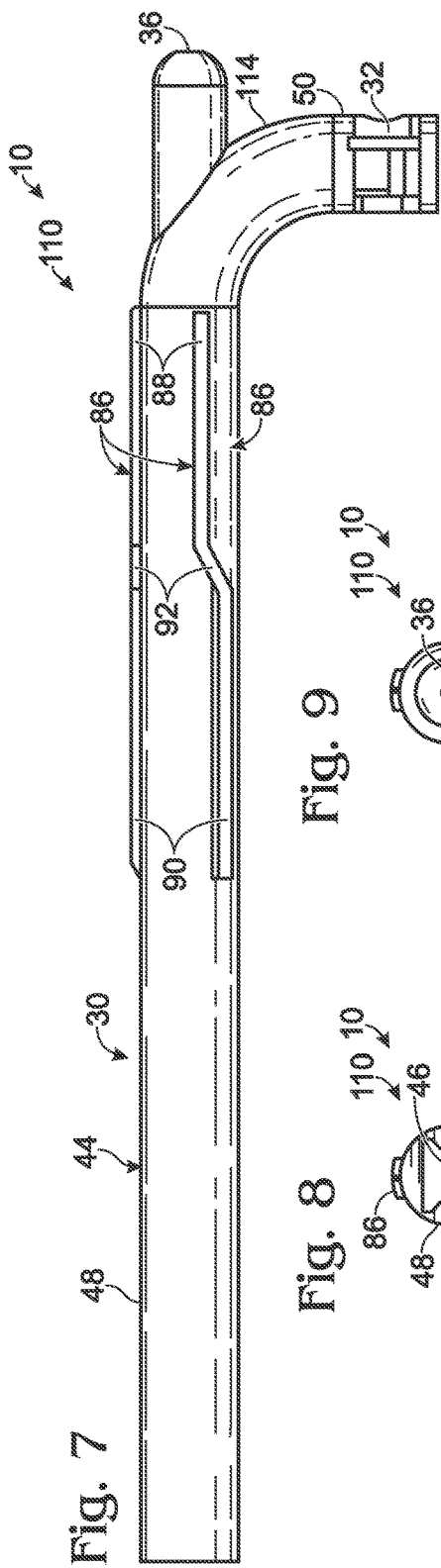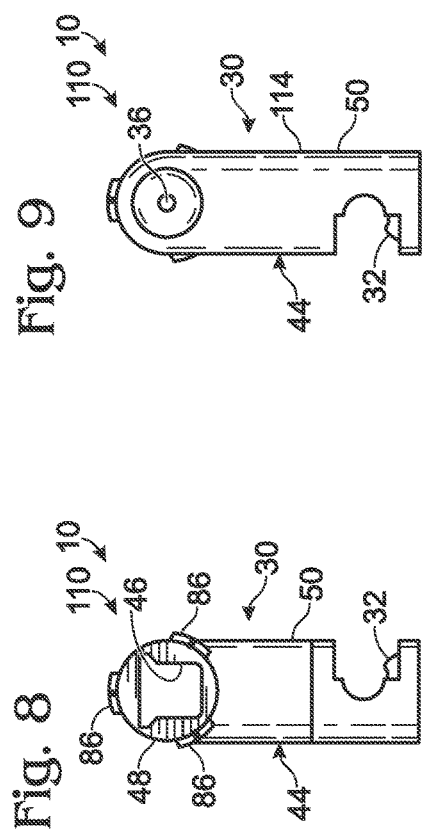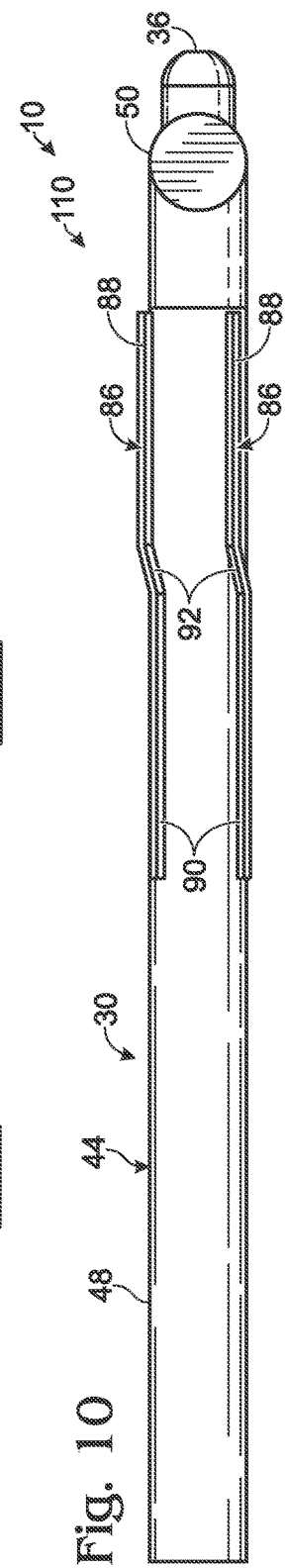

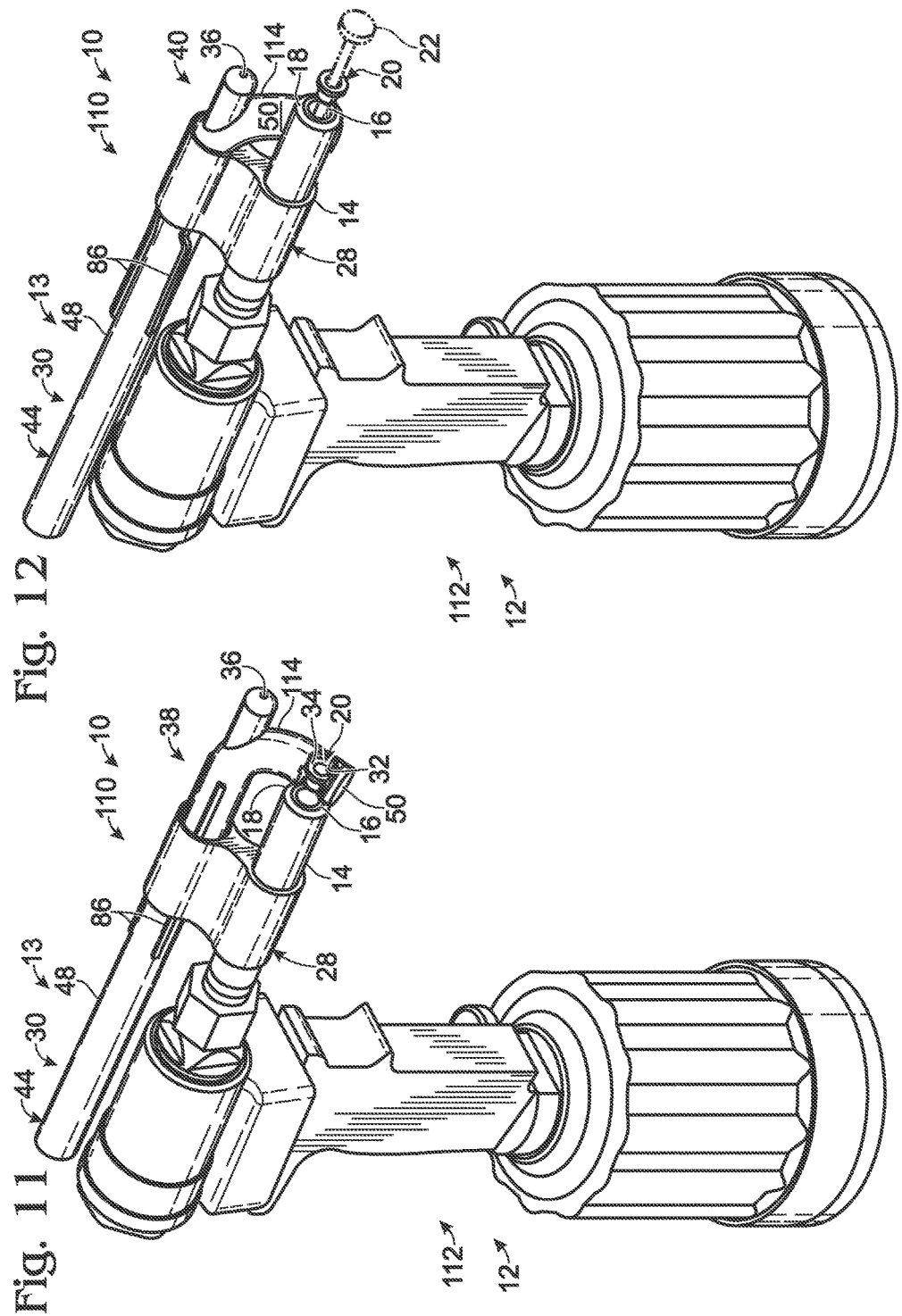

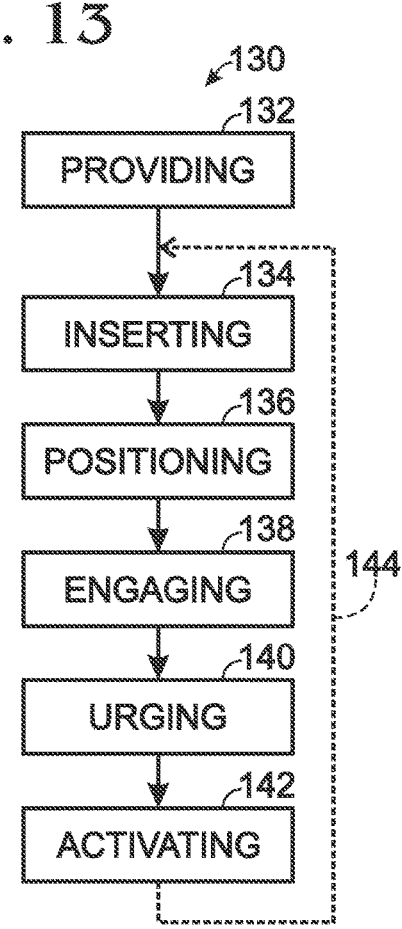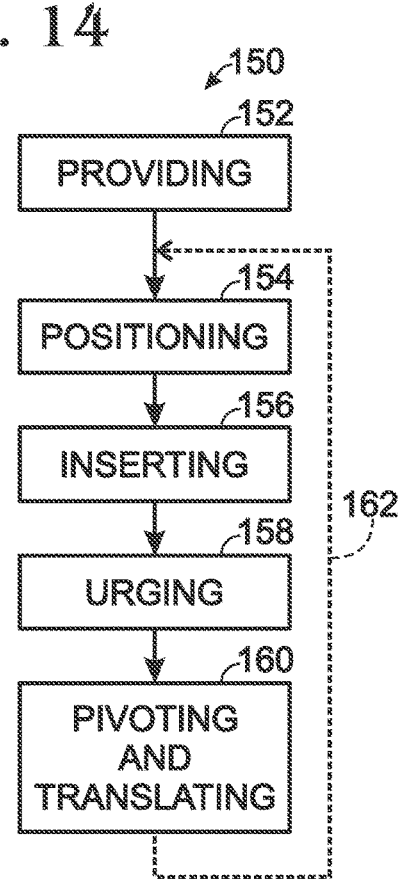

LOCKBOLT COLLAR FEED MECHANISMS, LOCKBOLT INSTALLATION TOOLS, AND METHODS OF INSTALLING LOCKBOLT ASSEMBLIES

FIELD

The present disclosure relates to lockbolt installation tools.

BACKGROUND

Lockbolt fastening systems have been around since at least the 1930s and were invented by Louis C. Huck, as disclosed in U.S. Pat. No. 2,114,493. Lockbolt fastening systems utilize two fasteners—a lockbolt pin and a lockbolt collar—for clamping together two or more structures via a common hole. Typical lockbolt pins include a head and a grooved shaft, and lockbolt collars come in a variety of forms, including flanged and flangeless lockbolt collars. To assemble a lockbolt, the lockbolt pin is inserted through the common hole, the lockbolt collar is placed over the shaft of the lockbolt pin, and a lockbolt installation tool is used to urge the lockbolt collar against the structures being fastened and swage, or crimp, the lockbolt collar into the grooves of the lockbolt pin's shaft, thereby fixing the lockbolt pin and the lockbolt collar together. In some systems, the lockbolt installation tool also breaks off a portion of the shaft of the lockbolt pin that extends past the lockbolt collar after the lockbolt collar is swaged onto the lockbolt pin.

Lockbolt fastening systems are used in a variety of industries, including the aerospace manufacturing industry. In some applications, several hundred or even several thousand lockbolt assemblies may be installed within a discrete area of a product being manufactured. In some such instances, access to an installation site may be confined, overhead, or otherwise difficult. A manufacturing technician's need to serially retrieve lockbolt collars from a supply and manually place them on corresponding lockbolt pins may be time consuming and awkward.

SUMMARY

Lockbolt collar feed mechanisms, lockbolt installation tools, and methods of installing lockbolt assemblies are disclosed herein.

Some lockbolt collar feed mechanisms according to the present disclosure are for use with lockbolt installation tools of the type that have an elongate nose assembly having an anvil at a distal end region of the elongate nose assembly for swaging a lockbolt collar on a corresponding lockbolt pin. Such lockbolt collar feed mechanisms comprise a mounting bracket configured to be operatively coupled to an associated lockbolt installation tool, and a collar cartridge operatively coupled to the mounting bracket and configured to hold a plurality of lockbolt collars. The collar cartridge includes an exit port configured to position a terminal lockbolt collar for selective placement onto a lockbolt pin. The collar cartridge includes a workpiece engagement surface positioned to face and engage a workpiece. The collar cartridge has a delivery position and a retracted position. In the delivery position, the exit port is positioned to position the terminal lockbolt collar forward of the anvil for selective placement of the terminal lockbolt collar onto the lockbolt pin. In the retracted position, the collar cartridge is pivoted relative to the delivery position about a pivot axis that is parallel to the elongate nose assembly and is positioned rearward relative to the delivery position. The collar cartridge is biased toward the delivery position. When the mounting bracket is operatively coupled to the lockbolt installation tool, a terminal lockbolt collar is positioned over a corresponding lockbolt pin, the workpiece engagement surface engages the workpiece, and the lockbolt installation tool is urged toward the workpiece, the collar cartridge moves from the delivery position to the retracted position and the terminal lockbolt collar is retained on the lockbolt pin.

Some lockbolt collar feed mechanisms according to the present disclosure comprise a collar cartridge and a mounting bracket operatively coupled to the collar cartridge and configured to be operatively coupled to a lockbolt installation tool. The collar cartridge has an elongate body that defines an internal bore that is sized to hold a plurality of lockbolt collars in single file. The elongate body has a first portion and a second portion that extends at an angle relative to the first portion. The second portion includes an exit port configured to position a terminal lockbolt collar for selective placement onto a lockbolt pin extending from a workpiece. The collar cartridge is configured to bias the plurality of lockbolt collars toward the exit port. The collar cartridge includes a workpiece engagement surface positioned to face and engage the workpiece when using the lockbolt collar feed mechanism. The collar cartridge and the mounting bracket collectively define an operational assembly that is configured such that when the collar cartridge is urged rearward relative to the mounting bracket, the collar cartridge pivots about a pivot axis and translates rearward along the pivot axis.

Some methods according to the present disclosure of installing a lockbolt assembly on a workpiece comprise providing the combination of a lockbolt installation tool and a lockbolt collar feed mechanism according to the present disclosure operatively coupled to the lockbolt installation tool, with a plurality of lockbolt collars held by the collar cartridge; inserting a first lockbolt pin through a first hole in the workpiece; positioning the combination so that a first terminal lockbolt collar of the plurality of lockbolt collars is inserted onto the first lockbolt pin and so that the first lockbolt pin extends into the elongate nose assembly of the lockbolt installation tool; engaging the workpiece engagement surface against the workpiece; urging the lockbolt installation tool toward the workpiece so that the collar cartridge pivots about the pivot axis and releases the first terminal lockbolt collar from the exit port and so that the collar cartridge translates rearward relative to the mounting bracket; and activating the lockbolt installation tool to swage the first terminal lockbolt collar on the first lockbolt pin.

Some methods according to the present disclosure of installing a lockbolt assembly on a workpiece comprise providing a supply of lockbolt collars in single file; positioning a terminal lockbolt collar from the supply of lockbolt collars onto a lockbolt pin; inserting the lockbolt pin into an elongate nose assembly of a lockbolt installation tool; urging the lockbolt installation tool toward the workpiece; and responsive to the urging, pivoting the supply of lockbolt collars about a pivot axis to release the terminal lockbolt collar from the supply of lockbolt collars and retain the terminal lockbolt collar on the lockbolt pin and translating the supply of lockbolt collars rearward relative to the lockbolt installation tool, wherein the pivot axis is parallel to the elongate nose assembly of the lockbolt installation tool.

BRIEF DESCRIPTION OF THE DRAWINGS

FIG. 3 is a schematic illustration representing lockbolt collar feed mechanisms and lockbolt installation tools according to the present disclosure, with the lockbolt collar feed mechanism in a retracted position, and with the lockbolt installation tool operatively swaging a lockbolt collar on a lockbolt pin associated with a workpiece.

FIG. 4 is a schematic illustration representing example operational assemblies of lockbolt collar feed mechanisms according to the present disclosure.

FIG. 5 is another schematic illustration representing example operational assemblies of lockbolt collar feed mechanisms according to the present disclosure.

FIG. 6 is a perspective view of an illustrative, non-exclusive example of a lockbolt collar feed mechanism according to the present disclosure.

FIG. 7 is a side view of the collar cartridge of the example lockbolt collar feed mechanism of FIG. 6.

FIG. 8 is an end view of the collar cartridge of the example lockbolt collar feed mechanism of FIG. 6.

FIG. 9 is another end view of the collar cartridge of the example lockbolt collar feed mechanism of FIG. 6.

FIG. 10 is another side view of the collar cartridge of the example lockbolt collar feed mechanism of FIG. 6.

FIG. 11 is a perspective view of the example lockbolt collar feed mechanism of FIG. 6 installed on a lockbolt installation tool, shown with the lockbolt collar feed mechanism in its delivery position.

FIG. 12 is a perspective view of the example lockbolt collar feed mechanism and the lockbolt installation tool of FIG. 11, shown with the lockbolt collar feed mechanism in its retracted position.

FIG. 13 is a flowchart schematically representing methods of installing lockbolt assemblies according to the present disclosure.

FIG. 14 is a flowchart schematically representing additional methods of installing lockbolt assemblies according to the present disclosure.

DESCRIPTION

Lockbolt collar feed mechanisms, lockbolt installation tools, and methods of installing lockbolt assemblies are disclosed herein. Generally, in the figures, elements that are likely to be included in a given example are illustrated in solid lines, while elements that are optional to a given example are illustrated in broken lines. However, elements that are illustrated in solid lines are not essential to all examples of the present disclosure, and an element shown in solid lines may be omitted from a particular example without departing from the scope of the present disclosure.

Figure 1:
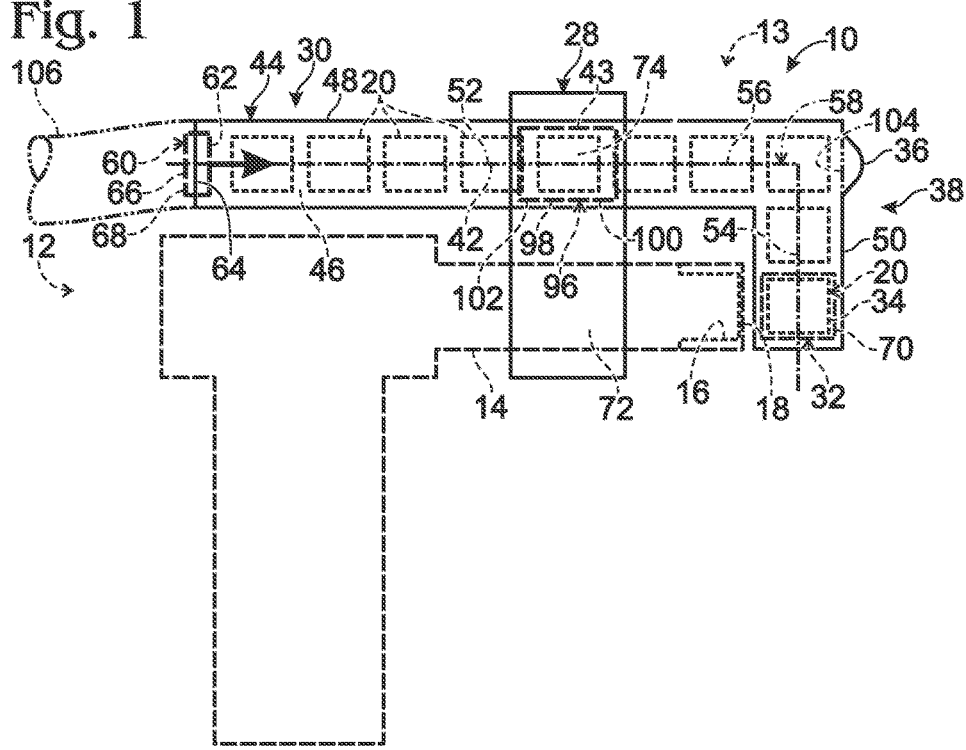
FIG. 1 is a schematic illustration representing lockbolt collar feed mechanisms and lockbolt installation tools according to the present disclosure, with the lockbolt collar feed mechanism in a delivery position.
Figure 2:
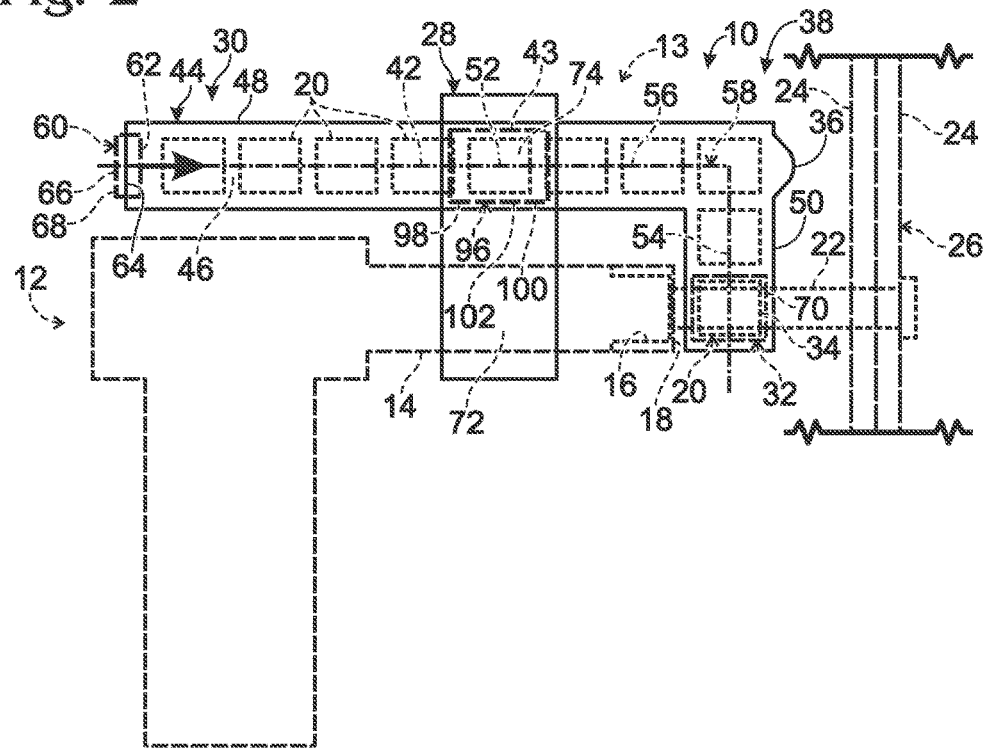
FIG. 2 is a schematic illustration representing lockbolt collar feed mechanisms and lockbolt installation tools according to the present disclosure, with the lockbolt collar feed mechanism in a delivery position with a terminal lockbolt collar on a lockbolt pin associated with a workpiece.

As schematically illustrated in FIGS. 1-3, lockbolt collar feed mechanisms 10 are configured to be used with lockbolt installation tools 12 of the type that have an elongate nose assembly 14 having an anvil 16 at a distal end 18 of the elongate nose assembly 14, with the anvil 16 being configured to swage, or crimp, a lockbolt collar 20 on a corresponding lockbolt pin 22. For example, as schematically illustrated in FIGS. 2-3, a lockbolt collar 20 and lockbolt pin 22 may be used to fasten together two structures 24, which collectively may be referred to herein as a workpiece 26. Collectively, a lockbolt pin 22 with a lockbolt collar 20 operatively swaged on the lockbolt pin 22 may be described as a lockbolt assembly 27. Lockbolt collar feed mechanisms 10 may be configured for use with any suitable lockbolt installation tool 12 and with any suitable configuration of lockbolt collars 20, including both flangeless lockbolt collars and flanged lockbolt collars. The combination of a lockbolt installation tool 12 with a lockbolt collar feed mechanism 10 operatively coupled to the lockbolt installation tool 12 collectively may be described as a lockbolt installation tool 13 or as a lockbolt installation tool assembly 13.

Lockbolt collar feed mechanisms 10 comprise at least a mounting bracket 28 that is configured to be operatively coupled to a lockbolt installation tool 12, and a collar cartridge 30 that is operatively coupled to the mounting bracket 28 and configured to hold a plurality of lockbolt collars 20.

The collar cartridge 30 includes an exit port 32 that is configured to position a terminal lockbolt collar 34 of the plurality of lockbolt collars 20 for selective placement onto a lockbolt pin 22 by a user of the lockbolt installation tool 12 and the lockbolt collar feed mechanism 10. As used herein, a "terminal" lockbolt collar 34 is a lockbolt collar 20 that is positioned within the exit port 32 of the collar cartridge 30.

The collar cartridge 30 includes a workpiece engagement surface 36 that is positioned to face and engage a workpiece 26 when using the lockbolt installation tool 12 and the lockbolt collar feed mechanism 10.

The collar cartridge 30 has a delivery position 38, schematically represented in FIGS. 1 and 2, and a retracted position 40, schematically represented in FIG. 3. The collar cartridge is biased, or at least configured to be biased, toward the delivery position. When in the delivery position 38, the exit port 32 is positioned to position the terminal lockbolt collar 34 forward of the anvil 16 for selective placement of the terminal lockbolt collar 34 onto the lockbolt pin 22 by the user of the lockbolt installation tool 12, such as schematically represented in FIG. 2. When in the retracted position 40, the collar cartridge 30 is pivoted, or rotated, relative to the delivery position 38 about a pivot axis 42 that is parallel to the elongate nose assembly 14 and is positioned rearward relative to the delivery position 38, as schematically represented in FIG. 3. That is, when transitioning from the delivery position 38 to the retracted position 40, the collar cartridge 30 both pivots and translates rearward (i.e., away from the workpiece 26) relative to the mounting bracket 28 and the elongate nose assembly 14.

Accordingly, as schematically represented in FIGS. 2 and 3, when the mounting bracket 28 is operatively coupled to a lockbolt installation tool 12, a terminal lockbolt collar 34 is positioned over a corresponding lockbolt pin 22, the workpiece engagement surface 36 engages the workpiece 26, and the lockbolt installation tool 12 is urged toward the workpiece 26 against the bias of the collar cartridge 30, the collar cartridge 30 moves from the delivery position 38 to the retracted position 40 and the terminal lockbolt collar 34 is retained on the lockbolt pin 22. That is, the terminal lockbolt collar 34 is released from, or otherwise exits, the exit port 32 of the collar cartridge 30 responsive to the collar cartridge 30 pivoting away from the delivery position 38 and due to the terminal lockbolt collar 34 being positioned over a lockbolt pin 22 that is fixed in the workpiece.

Additionally or alternatively, as schematically represented in FIGS. 1-3, the collar cartridge 30 and the mounting bracket 28 may be described as collectively defining an operational assembly 43, with the operational assembly 43 being configured such that when the collar cartridge 30 is urged rearward relative to the mounting bracket 28, the collar cartridge 30 pivots about the pivot axis 42 and translates rearward along the pivot axis 42.

In some examples of lockbolt collar feed mechanism 10, the collar cartridge 30 has an elongate body 44 that defines an internal bore 46 that is sized and shaped to hold the plurality of lockbolt collars 20 in single file. For example, a perpendicular cross-sectional profile of the internal bore 46 may be shaped to correspond with the profile of the lockbolt collars 20 being used with the lockbolt collar feed mechanism 10, such as the internal bore 46 having a rectangular profile corresponding to flangeless lockbolt collars or having a profile shape corresponding to flanged lockbolt collars.

The elongate body 44 may be described as having a first portion 48 and a second portion 50 that extends at an angle relative to the first portion 48, with the second portion 50 including the exit port 32 of the collar cartridge 30. Additionally or alternatively, the first portion 48 may be described as having a longitudinal axis 52, and the second portion 50 may be described as having a longitudinal axis 54 that is transverse to the longitudinal axis 52. Collectively, the longitudinal axis 52 and the longitudinal axis 54 collectively may be described as defining a longitudinal axis 56 of the internal bore 46, of the elongate body 44, and/or of the collar cartridge 30, and/or as defining a path of travel 58 for the plurality of lockbolt collars 20 held within the internal bore 46.

In some examples, the second portion 50 may extend at a right angle, or approximately a right angle, relative to the first portion 48, such as schematically represented in FIGS. 1-3.

In some examples, the pivot axis 42 is coaxial with the longitudinal axis 52 of the first portion 48 of the elongate body 44. Accordingly, in some examples, when transitioning between the delivery position 38 and the retracted position 40, the collar cartridge 30 pivots, or rotates, about the longitudinal axis 52 of the first portion 48.

In some examples, the mounting bracket 28 is configured to be operatively coupled to the lockbolt installation tool 12 to position the first portion 48 of the elongate body 44 parallel to the elongate nose assembly 14 of the lockbolt installation tool, that is, with the longitudinal axis 52 of the first portion 48 being parallel to the elongate nose assembly 14.

In some examples, the workpiece engagement surface 36 is positioned forward of the second portion 50 relative to the first portion 48. Accordingly, as schematically represented in FIGS. 2 and 3, when the lockbolt installation tool 12 is urged toward the workpiece 26, the workpiece engagement surface 36 engages the workpiece 26, but the second portion 50 of the elongate body 44 does not engage the workpiece 26.

In some such examples, the workpiece engagement surface 36 has a surface area that is less than a perpendicular cross-sectional area of the first portion 48. Accordingly, friction between the workpiece engagement surface 36 and the workpiece 26 may be minimal, or at least less than with respect to a larger surface area, when the workpiece engagement surface 36 rotates against the workpiece 26 as the collar cartridge pivots between the delivery position 38 and the retracted position 40 responsive to a user urging the lockbolt installation tool 12 toward the workpiece 26. Thus, undesirable marring of the workpiece 26 may be avoided. In some examples, the workpiece engagement surface 36 is one or more of curved, non-planar, and/or at least partially spherical.

In some examples, as schematically represented in FIG. 1, workpiece engagement surface 36 may be a forward surface of a workpiece engagement structure 104 that is configured to be selectively repositionable relative to the remainder of the collar cartridge 30. In some such examples, the workpiece engagement structure 104 may be configured to be selectively translated relative to the elongate body 44, such as along the longitudinal axis 52 of the first portion 48 of the elongate body 44. Accordingly, the position of the workpiece engagement surface 36 relative to the elongate body 44 may be selectively adjusted by a user for various applications and configurations of workpieces 26. Additionally or alternatively, in some examples, the optional workpiece engagement structure 104 may comprise a swivel adjustment to permit a user to selectively adjust an angle of the workpiece engagement surface 36 relative to the elongate body 44, and thus relative to a workpiece 26. In some such examples, the workpiece engagement structure 104 may be described as, or as comprising, a swivel pad.

Some examples of lockbolt collar feed mechanisms 10 further comprise a collar bias mechanism 60 that is operatively coupled to the collar cartridge 30 and that is configured to urge the plurality of lockbolt collars 20 toward the exit port 32, as schematically represented by the arrow in FIGS. 1-3. For example, the collar bias mechanism 60 may comprise a spring or springs 62 that are supported by the collar cartridge 30, such as by an inner end surface 64 of the collar cartridge 30. Additionally or alternatively, the collar bias mechanism 60 may comprise one or more of a source of pressurized air 66 or a source of pressurized hydraulic fluid 68 that is configured to urge the plurality of lockbolt collars 20 toward the exit port 32. In some such examples, the source of pressurized air 66 or the source of pressurized hydraulic fluid 68 also may be associated with the lockbolt installation tool 12 for operation thereof.

In some examples of collar cartridge 30, the exit port 32 is configured to at least temporarily retain the terminal lockbolt collar 34 for placement onto a lockbolt pin 22 by the user and to permit the terminal lockbolt collar 34 to be withdrawn from the exit port 32 responsive to the collar cartridge 30 pivoting about the pivot axis 42 when the collar cartridge 30 moves from the delivery position 38 toward the retracted position 40. In some such examples, the terminal lockbolt collar 34 is held in the exit port 32 in a friction-fit arrangement. In some examples, the exit port 32 may include a mechanical assembly 70 that selectively retains the terminal lockbolt collar 34 when the collar cartridge 30 is in the delivery position 38 and that selectively releases the terminal lockbolt collar 34 when the collar cartridge 30 moves from the delivery position 38 toward the retracted position 40. In some examples, the exit port 32 is configured to mate with flanged lockbolt collars. In some examples, the exit port 32 is configured to mate with flangeless lockbolt collars. In some examples, the exit port 32 is configured to mate both with flanged and flangeless lockbolt collars.

The mounting bracket 28 of lockbolt feed mechanisms 10 may be configured to be operatively coupled to a lockbolt installation tool 12 in any suitable manner such that the collar cartridge 30 is operatively positioned relative to the anvil 16 of the lockbolt installation tool 12. In some examples, the mounting bracket 28 is configured to be operatively coupled to the elongate nose assembly 14 of the lockbolt installation tool 12. As an illustrative, non-exclusive example, the mounting bracket 28 may define a nose bore 72 that is sized and shaped to fit over an elongate nose assembly 14. In some examples, the mounting bracket 28 may utilize a set screw or other mechanical fastener for operatively securing the mounting bracket 28, and thus the lockbolt collar feed mechanism 10, to the lockbolt installation tool 12. Other examples also are within the scope of the present disclosures, including examples in which the mounting bracket 28 is configured to be operatively coupled to a portion of a lockbolt installation tool 12 other than its elongate nose assembly 14.

The mounting bracket 28 of lockbolt feed mechanisms 10 also may be configured to be operatively coupled to the collar cartridge 30 in any suitable manner such that the collar cartridge 30 is operatively positioned relative to the anvil 16 of the lockbolt installation tool 12. In some examples, the mounting bracket 28 defines a cartridge bore 74, and the elongate body 44 of the collar cartridge 30 extends through the cartridge bore 74.

With reference to FIG. 4, in some examples, one of the cartridge bore 74 and the elongate body 44 comprises one or more channels 76, with each channel 76 comprising a forward elongate section 78, a rearward elongate section 80, and a step section 82. The forward elongate section 78 is parallel to the longitudinal axis 56 of the elongate body 44. The rearward elongate section 80 also is parallel to the longitudinal axis 56, but it is spaced longitudinally rearward of the forward elongate section 78 and is spaced radially about the longitudinal axis 56 relative to the forward elongate section 78. The step section 82 interconnects the forward elongate section 78 and the rearward elongate section 80, as illustrated in FIG. 4. In such examples, the other of the cartridge bore 74 and the elongate body 44 comprises one or more pins 84, with each pin 84 extending into a respective channel 76 and being configured to operatively translate along the respective channel 76 from the rearward elongate section 80 to the step section 82 to the forward elongate section 78 when the collar cartridge 30 moves from the delivery position 38 to the retracted position 40.

In some examples, a pin 84 may comprise a roller.

In some examples, a plurality of channels 76 are radially spaced about the longitudinal axis 56 of the elongate body 44.

With reference to FIG. 5, in some examples, one of the cartridge bore 74 and the elongate body 44 comprises one or more ridges 86, with each ridge 86 comprising a forward elongate section 88, a rearward elongate section 90, and a step section 92. The forward elongate section 88 is parallel to the longitudinal axis 56 of the elongate body 44. The rearward elongate section 90 also is parallel to the longitudinal axis 56, but it is spaced longitudinally rearward of the forward elongate section 88 and is spaced radially about the longitudinal axis 56 relative to the forward elongate section 88. The step section 92 interconnects the forward elongate section 88 and the rearward elongate section 90, as illustrated in FIG. 5. In such examples, the other of the cartridge bore 74 and the elongate body 44 comprises one or more followers 94, with each follower 94 engaging a respective ridge 86 and being configured to operatively translate along the respective ridge 86 from the rearward elongate section 90 to the step section 92 to the forward elongate section 88 when the collar cartridge 30 moves from the delivery position 38 to the retracted position 40.

In some examples, a follower 94 may comprise a roller.

In some examples, as optionally illustrated in FIG. 5, two followers 94 may be associated with, and positioned on opposite sides of, a respective ridge 86.

In some examples, a plurality of ridges 86 are radially spaced about the longitudinal axis 56 of the elongate body 44.

In some examples, the cartridge bore 74 may comprise one or more channels 76 and one or more ridges 86, and the elongate body 44 may comprise one or more corresponding pins 84 and one or more corresponding followers 94.

With reference back to the schematic representations of FIGS. 1-3, some examples of lockbolt collar feed mechanisms 10 further comprise a cartridge bias mechanism 96 that is configured to operatively bias the collar cartridge 30 toward the delivery position 38. In some such examples, the cartridge bias mechanism 96 comprises a spring 102 that is operatively supported by the collar cartridge 30 and the mounting bracket 28 and that is configured to urge the collar cartridge 30 toward the delivery position 38. In some examples, the cartridge bias mechanism 96 comprises a source of pressurized air 98 or a source of pressurized hydraulic fluid 100 that is configured to urge the collar cartridge 30 toward the delivery position 38. In some such examples, the source of pressurized air 98 or the source of pressurized hydraulic fluid 100 also may be associated with the lockbolt installation tool 12 for operation thereof. Also, in some such examples, the spring 102, the source of pressurized air 98, or the source of pressurized hydraulic fluid 100 may be the optional spring 62, the optional source of pressurized air 66, or the optional source of pressurized hydraulic fluid 68, respectively, discussed above and optionally utilized to bias the lockbolt collars 20 through the internal bore 46 of the elongate body 44 toward the exit port 32.

As schematically and optionally illustrated in FIG. 1, some examples of collar cartridges 30 are configured to be operatively coupled to a supply structure 106 for feeding a supply of lockbolt collars 20 to the collar cartridge 30. Additionally or alternatively, a lockbolt collar feed mechanism 10 may comprise such a supply structure 106. The supply structure 106, when present, may take any suitable form and configuration such that it operatively supplies lockbolt collars 20 to the collar cartridge 30. For example, the supply structure 106 may comprise a flexible tube that is configured to be operatively connected to a supply of lockbolt collars 20, such as that pneumatically, mechanically, or otherwise urges lockbolt collars 20 through the supply structure 106 and to the collar cartridge 30. In some such examples, the supply may be configured to hold hundreds or even thousands or more of lockbolt collars 20.

Additionally or alternatively, a collar cartridge 30 may be configured to be selectively detached from the mounting bracket 28, such that a user may selectively replace it with another collar cartridge 30 that is preloaded with a plurality of lockbolt collars 20. For example, a user may have a supply of preloaded collar cartridges 30 available during a manufacturing operation, such that the user may continually remove and replace collar cartridges 30 for continued use and application of lockbolt assemblies 27.

Turning now to FIGS. 6-12, an illustrative, non-exclusive example of a lockbolt collar feed mechanism 10 in the form of lockbolt collar feed mechanism 110 and an illustrative, non-exclusive example of a lockbolt installation tool 12 in the form of lockbolt installation tool 112 are illustrated. Where appropriate, the reference numerals from the schematic illustrations of FIGS. 1-5 are used to designate corresponding parts of the lockbolt collar feed mechanism 110 and the lockbolt installation tool 112; however, the examples of FIGS. 6-12 are non-exclusive and do not limit lockbolt collar feed mechanisms 10 and lockbolt installation tools 12 to the illustrated embodiments of FIGS. 6-12. That is, lockbolt collar feed mechanisms 10 and lockbolt installation tools 12 are not limited to the specific embodiments of the illustrated examples of FIGS. 6-12, and lockbolt collar feed mechanisms 10 and lockbolt installation tools 12 may incorporate any number of the various aspects, configurations, characteristics, properties, etc. of lockbolt collar feed mechanisms 10 and lockbolt installation tools 12 that are illustrated in and discussed with reference to the schematic representations of FIGS. 1-5 and/or the embodiments of FIGS. 6-12, as well as variations thereof, without requiring the inclusion of all such aspects, configurations, characteristics, properties, etc. For the purpose of brevity, each previously discussed component, part, portion, aspect, region, etc. or variants thereof may not be discussed, illustrated, and/or labeled again with respect to lockbolt collar feed mechanism 110 and lockbolt installation tool 112; however, it is within the scope of the present disclosure that the previously discussed features, variants, etc. may be utilized with lockbolt collar feed mechanism 110 and lockbolt installation tool 112.

As seen in FIG. 6, lockbolt collar feed mechanism 110 is an example of a lockbolt collar feed mechanism 10 whose mounting bracket 28 defines a nose bore 72 for being operatively coupled to an elongate nose assembly 14 of a lockbolt installation tool 12, and a cartridge bore 74, through which the elongate body 44 of the collar cartridge 30 extends.

As perhaps best seen in the end view of FIG. 8, the internal bore 46 of the elongate body 44 is shaped to correspond to and receive flanged lockbolt collars. Accordingly, lockbolt collar feed mechanism 110 is an example of a lockbolt collar feed mechanism 10 that is configured for use with flanged lockbolt collars.

Lockbolt collar feed mechanism 110 is an example of a lockbolt collar feed mechanism 10 whose collar cartridge 30 includes a workpiece engagement surface 36 that is at least partially spherical and that extends forward of the second portion 50 of the elongate body 44 of the collar cartridge 30. Moreover, lockbolt collar feed mechanism 110 is an example whose second portion 50 extends at an angle that is transverse to the first portion 48 of the elongate body 44. In this example, the second portion 50 includes a curved region 114 that extends from the first portion 48 toward the exit port 32. Accordingly, the internal bore 46 of the collar cartridge 30 of lockbolt collar feed mechanism 110 provides a smooth path of travel for lockbolt collars to travel through toward the exit port 32.

Lockbolt collar feed mechanism 110 is an example of a lockbolt collar feed mechanism 10 whose collar cartridge 30 includes three radially spaced ridges 86 around the elongate body 44 and whose mounting bracket 28 includes three pairs of corresponding followers 94 extending from the cartridge bore 74 of the mounting bracket 28.

FIGS. 11 and 12 illustrate lockbolt collar feed mechanism 110 operatively coupled to lockbolt installation tool 112. FIG. 11 illustrates the collar cartridge 30 in its delivery position 38 with a terminal lockbolt collar 34 positioned forward of the elongate nose assembly 14 of lockbolt installation tool 112 for operative placement over a corresponding lockbolt pin. FIG. 12 illustrates the collar cartridge 30 in its retracted position 40 and with a lockbolt collar 20 (formerly a terminal lockbolt collar 34) retained on a corresponding lockbolt pin 22.

FIGS. 13 and 14 schematically provide flowcharts that represent illustrative, non-exclusive examples of methods according to the present disclosure. The methods and steps illustrated in FIGS. 13 and 14 are not limiting and other methods and steps are within the scope of the present disclosure, including methods having greater than or fewer than the number of steps illustrated, as understood from the discussions herein.

Beginning with FIG. 13, methods 130 of installing a lockbolt assembly on a workpiece are schematically represented. As shown, methods 130 comprise providing 132 a lockbolt collar feed mechanism 10 and a lockbolt installation tool 12 with the lockbolt collar feed mechanism 10 operatively coupled to the lockbolt installation tool 12 and with a plurality of lockbolt collars 20 held by the collar cartridge 30 of the lockbolt collar feed mechanism 10. Methods 130 further comprise inserting 134 a first lockbolt pin 22 through a first hole in the workpiece, and positioning 136 the combination of the lockbolt collar feed mechanism 10 and the lockbolt installation tool 12 so that a first terminal lockbolt collar 34 is inserted onto the first lockbolt pin and so that the first lockbolt pin extends into the elongate nose assembly 14 of the lockbolt installation tool 12. Methods 130 further comprise engaging 138 the workpiece engagement surface 36 of the collar cartridge 30 against the workpiece, and urging 140 the lockbolt installation tool 12 toward the workpiece so that the collar cartridge 30 pivots about the pivot axis 42 and releases the first terminal lockbolt collar from the exit port 32 and so that the collar cartridge 30 translates rearward relative to the mounting bracket 28. Methods 130 further comprise activating 142 the lockbolt installation tool 12 to swage the first terminal lockbolt collar on the first lockbolt pin.

As schematically and optionally represented in FIG. 13, some methods 130 further comprise repeating 144 the inserting 134, the positioning 136, the engaging 138, the urging 140, and the activating 142 with a second lockbolt pin, a second hole, and a second terminal lockbolt collar.

Turning now to FIG. 14, methods 150 of installing a lockbolt assembly on a workpiece are schematically represented, with methods 150 not requiring use of the specific lockbolt collar feed mechanisms 10 and lockbolt installation tools 12 disclosed herein. That said, methods 150 may be performed by the combination of a lockbolt collar feed mechanism 10 and a lockbolt installation tool 12. As shown, methods 150 comprise providing 152 a supply of lockbolt collars in single file, positioning 154 a terminal lockbolt collar from the supply of lockbolt collars onto a lockbolt pin, inserting 156 the lockbolt pin into an elongate nose assembly of a lockbolt installation tool, urging 158 the lockbolt installation tool toward the workpiece, and responsive to the urging 158, pivoting the supply of lockbolt collars about a pivot axis to release the terminal lockbolt collar from the supply of lockbolt collars and retain the terminal lockbolt collar on the lockbolt pin and translating the supply of lockbolt collars rearward relative to the lockbolt installation tool as indicated at 160. In methods 150, the pivot axis is parallel to the elongate nose assembly of the lockbolt installation tool.

As schematically and optionally represented in FIG. 14, some methods 150 further comprise repeating 162 the positioning 154, the inserting 156, the urging 158, and the pivoting and translating 160 with a second terminal lockbolt collar and a second lockbolt pin.

Illustrative, non-exclusive examples of inventive subject matter according to the present disclosure are described in the following enumerated paragraphs:

A. A lockbolt collar feed mechanism for use with a lockbolt installation tool that has an elongate nose assembly having an anvil at a distal end region of the elongate nose assembly for swaging a lockbolt collar on a corresponding lockbolt pin, the lockbolt collar feed mechanism comprising:

a mounting bracket configured to be operatively coupled to the lockbolt installation tool; and a collar cartridge operatively coupled to the mounting bracket and configured to hold a plurality of lockbolt collars, wherein the collar cartridge includes an exit port configured to position a terminal lockbolt collar of the plurality of lockbolt collars for selective placement onto a lockbolt pin by a user of the lockbolt installation tool and the lockbolt collar feed mechanism, wherein the collar cartridge includes a workpiece engagement surface positioned to face and engage a workpiece when using the lockbolt installation tool and the lockbolt collar feed mechanism, wherein the collar cartridge has a delivery position and a retracted position, wherein in the delivery position, the exit port is positioned to position the terminal lockbolt collar forward of the anvil for selective placement of the terminal lockbolt collar onto the lockbolt pin by the user, wherein in the retracted position, the collar cartridge is pivoted relative to the delivery position about a pivot axis that is parallel to the elongate nose assembly and is positioned rearward relative to the delivery position, and wherein the collar cartridge is biased toward the delivery position;

wherein when the mounting bracket is operatively coupled to the lockbolt installation tool, when the workpiece engagement surface engages the workpiece, and when the lockbolt installation tool is urged toward the workpiece, the collar cartridge moves from the delivery position to the retracted position and the terminal lockbolt collar is retained on the lockbolt pin.

A1. The lockbolt collar feed mechanism of paragraph A, wherein the collar cartridge has an elongate body that defines an internal bore that is sized to hold the plurality of lockbolt collars in single file, wherein the elongate body has a first portion and a second portion that extends at an angle relative to the first portion, and wherein the second portion includes the exit port.

A1.1. The lockbolt collar feed mechanism of paragraph A1, wherein the pivot axis is coaxial with a longitudinal axis of the first portion of the elongate body.

A1.2. The lockbolt collar feed mechanism of any of paragraphs A1-A1.1, wherein the mounting bracket is configured to be operatively coupled to the lockbolt installation tool to position the first portion of the elongate body parallel to the elongate nose assembly of the lockbolt installation tool.

A1.3. The lockbolt collar feed mechanism of any of paragraphs A1-A1.2, wherein the workpiece engagement surface is positioned forward of the second portion relative to the first portion.

A1.4. The lockbolt collar feed mechanism of any of paragraphs A1-A1.3, wherein the workpiece engagement surface has a surface area less than a perpendicular cross-sectional area of the first portion.

A2. The lockbolt collar feed mechanism of any of paragraphs A-A1.4, wherein the workpiece engagement surface is curved.

A3. The lockbolt collar feed mechanism of any of paragraphs A-A2, further comprising:

a collar bias mechanism operatively coupled to the collar cartridge, wherein the collar bias mechanism is configured to urge the plurality of lockbolt collars toward the exit port.

A3.1. The lockbolt collar feed mechanism of paragraph A3, wherein the collar bias mechanism comprises a spring supported by the collar cartridge.

A3.2. The lockbolt collar feed mechanism of any of paragraphs A3-A3.1, wherein the collar bias mechanism comprises a source of pressurized air or a source of pressurized hydraulic fluid.

A4. The lockbolt collar feed mechanism of any of paragraphs A-A3.2, wherein the exit port is configured to at least temporarily retain the terminal lockbolt collar for placement onto a lockbolt pin by the user and to permit the terminal lockbolt collar to be withdrawn from the exit port responsive to the collar cartridge pivoting about the pivot axis when the collar cartridge moves from the delivery position toward the retracted position.

A5. The lockbolt collar feed mechanism of any of paragraphs A-A4, wherein the exit port is configured to mate with a flanged lockbolt collar.

A6. The lockbolt collar feed mechanism of any of paragraphs A-A5, wherein the mounting bracket is configured to be operatively coupled to the elongate nose assembly of the lockbolt installation tool.

A7. The lockbolt collar feed mechanism of any of paragraphs A-A6, wherein the mounting bracket defines a cartridge bore;

wherein the collar cartridge comprises an elongate body having a longitudinal axis, wherein the elongate body extends through the cartridge bore of the mounting bracket;

wherein one of the cartridge bore and the elongate body comprises one or more channels, wherein each of the one or more channels comprises a forward elongate section parallel to the longitudinal axis, a rearward elongate section parallel to the longitudinal axis spaced longitudinally rearward of the forward elongate section and radially about the longitudinal axis relative to the forward elongate section, and a step section that interconnects the forward elongate section and the rearward elongate section; and wherein the other of the cartridge bore and the elongate body comprises one or more pins, wherein each pin of the one or more pins extends into a respective channel of the one or more channels and is configured to operatively translate along the respective channel from the rearward elongate section to the step section to the forward elongate section when the collar cartridge moves from the delivery position to the retracted position.

A7.1. The lockbolt collar feed mechanism of paragraph A7, wherein the one or more channels comprises a plurality of channels radially spaced about the longitudinal axis.

A8. The lockbolt collar feed mechanism of any of paragraphs A-A7.1, wherein the mounting bracket defines a cartridge bore;

wherein the collar cartridge comprises an elongate body having a longitudinal axis, wherein the elongate body extends through the cartridge bore of the mounting bracket;

wherein one of the cartridge bore and the elongate body comprises one or more ridges, wherein each of the one or more ridges comprises a forward elongate section parallel to the longitudinal axis, a rearward elongate section parallel to the longitudinal axis spaced longitudinally rearward of the forward elongate section of the ridge and radially about the longitudinal axis relative to the forward elongate section of the ridge, and a step section that interconnects the forward elongate section of the ridge and the rearward elongate section of the ridge; and wherein the other of the cartridge bore and the elongate body comprises one or more followers, wherein each follower of the one or more followers engages a respective ridge of the one or more ridges and is configured to operatively translate along the respective ridge from the rearward elongate section of the ridge to the step section of the ridge to the forward elongate section of the ridge when the collar cartridge moves from the delivery position to the retracted position.

A8.1. The lockbolt collar feed mechanism of paragraph A8, wherein the one or more ridges comprises a plurality of ridges radially spaced about the longitudinal axis.

A9. The lockbolt collar feed mechanism of any of paragraphs A-A8.1, further comprising: a cartridge bias mechanism configured to operatively bias the collar cartridge toward the delivery position.

A9.1. The lockbolt collar feed mechanism of paragraph A9, wherein the cartridge bias mechanism comprises a spring operatively supported by the collar cartridge and the mounting bracket.

A9.2. The lockbolt collar feed mechanism of any of paragraphs A9-A9.1, wherein the cartridge bias mechanism comprises a source of pressurized air or a source of pressurized hydraulic fluid.

A10. The lockbolt collar feed mechanism of any of paragraphs A-A9.2 in combination with the lockbolt installation tool, wherein the mounting bracket is operatively coupled to the lockbolt installation tool.

A10.1. The use of the combination of paragraph A10 to install a lockbolt assembly on the workpiece.

A11. The use of the lockbolt collar feed mechanism of any of paragraphs A-A9.2 to position a lockbolt collar on a corresponding lockbolt pin.

B. A lockbolt collar feed mechanism, comprising:

a collar cartridge, wherein the collar cartridge has an elongate body that defines an internal bore that is sized to hold a plurality of lockbolt collars in single file, wherein the elongate body has a first portion and a second portion that extends at an angle relative to the first portion, wherein the second portion includes an exit port configured to position a terminal lockbolt collar of the plurality of lockbolt collars for selective placement onto a lockbolt pin extending from a workpiece, wherein the collar cartridge is configured to bias the plurality of lockbolt collars toward the exit port, and wherein the collar cartridge includes a workpiece engagement surface positioned to face and engage the workpiece when using the lockbolt collar feed mechanism; and a mounting bracket operatively coupled to the collar cartridge and configured to be operatively coupled to a lockbolt installation tool;

wherein the collar cartridge and the mounting bracket collectively define an operational assembly, wherein the operational assembly is configured such that when the collar cartridge is urged rearward relative to the mounting bracket, the collar cartridge pivots about a pivot axis and translates rearward along the pivot axis.

B1. The lockbolt collar feed mechanism of paragraph B, further comprising the subject matter of any one or more of paragraphs A-A9.2.

B2. The lockbolt collar feed mechanism of any of paragraphs B-B1 in combination with the lockbolt installation tool, wherein the mounting bracket is operatively coupled to the lockbolt installation tool.

B2.1. The use of the combination of paragraph B2 to install a lockbolt assembly on the workpiece.

B3. The use of the lockbolt collar feed mechanism of any of paragraphs B-B1 to position a lockbolt collar on a corresponding lockbolt pin.

C. A method of installing a lockbolt assembly on a workpiece, the method comprising:

providing the combination of paragraph A10 or paragraph B2, wherein a plurality of lockbolt collars are held by the collar cartridge;

inserting a first lockbolt pin through a first hole in the workpiece;

positioning the combination so that a first terminal lockbolt collar of the plurality of lockbolt collars is inserted onto the first lockbolt pin and so that the first lockbolt pin extends into the elongate nose assembly of the lockbolt installation tool;

engaging the workpiece engagement surface against the workpiece;

urging the lockbolt installation tool toward the workpiece so that the collar cartridge pivots about the pivot axis and releases the first terminal lockbolt collar from the exit port and so that the collar cartridge translates rearward relative to the mounting bracket; and activating the lockbolt installation tool to swage the first terminal lockbolt collar on the first lockbolt pin.

C1. The method of paragraph C, further comprising:

repeating the inserting, the positioning, the engaging, the urging, and the activating with a second lockbolt pin, a second hole, and a second terminal lockbolt collar.

D. A method of installing a lockbolt assembly on a workpiece, the method comprising:

providing a supply of lockbolt collars in single file;

positioning a terminal lockbolt collar from the supply of lockbolt collars onto a lockbolt pin;

inserting the lockbolt pin into an elongate nose assembly of a lockbolt installation tool;

urging the lockbolt installation tool toward the workpiece; and responsive to the urging, pivoting the supply of lockbolt collars about a pivot axis to release the terminal lockbolt collar from the supply of lockbolt collars and retain the terminal lockbolt collar on the lockbolt pin and translating the supply of lockbolt collars rearward relative to the lockbolt installation tool, wherein the pivot axis is parallel to the elongate nose assembly of the lockbolt installation tool.

D1. The method of paragraph D, further comprising repeating the positioning, the inserting, the urging, and the pivoting and translating with a second terminal lockbolt collar and a second lockbolt pin.

D2. The method of any of paragraphs D-D1, wherein the method utilizes the lockbolt collar feed mechanism of any of paragraphs A-A9.2 and B-B1 and/or the combination of any of paragraphs A10 and B2.

As used herein, the terms "adapted" and "configured" mean that the element, component, or other subject matter is designed and/or intended to perform a given function. Thus, the use of the terms "adapted" and "configured" should not be construed to mean that a given element, component, or other subject matter is simply "capable of" performing a given function but that the element, component, and/or other subject matter is specifically selected, created, implemented, utilized, programmed, and/or designed for the purpose of performing the function. It is also within the scope of the present disclosure that elements, components, and/or other recited subject matter that is recited as being adapted to perform a particular function may additionally or alternatively be described as being configured to perform that function, and vice versa. Similarly, subject matter that is recited as being configured to perform a particular function may additionally or alternatively be described as being operative to perform that function.

The various disclosed elements of apparatuses and steps of methods disclosed herein are not required to all apparatuses and methods according to the present disclosure, and the present disclosure includes all novel and non-obvious combinations and subcombinations of the various elements and steps disclosed herein. Moreover, one or more of the various elements and steps disclosed herein may define independent inventive subject matter that is separate and apart from the whole of a disclosed apparatus or method. Accordingly, such inventive subject matter is not required to be associated with the specific apparatuses and methods that are expressly disclosed herein, and such inventive subject matter may find utility in apparatuses and/or methods that are not expressly disclosed herein.

The invention claimed is:

1. A lockbolt collar feed mechanism for use with a lockbolt installation tool that has an elongate nose assembly having an anvil at a distal end region of the elongate nose assembly for swaging a lockbolt collar on a corresponding lockbolt pin, the lockbolt collar feed mechanism comprising:
   a mounting bracket configured to be operatively coupled to the lockbolt installation tool; and
   a collar cartridge operatively coupled to the mounting bracket and configured to hold a plurality of lockbolt collars, wherein the collar cartridge includes an exit port configured to position a terminal lockbolt collar of the plurality of lockbolt collars for selective placement onto a lockbolt pin by a user of the lockbolt installation tool and the lockbolt collar feed mechanism, wherein the collar cartridge includes a workpiece engagement surface positioned to face and engage a workpiece when using the lockbolt installation tool and the lockbolt collar feed mechanism, wherein the collar cartridge has a delivery position and a retracted position, wherein in the delivery position, the exit port is positioned to position the terminal lockbolt collar forward of the anvil for selective placement of the terminal lockbolt collar onto the lockbolt pin by the user, wherein in the retracted position, the collar cartridge is pivoted relative to the delivery position about a pivot axis that is parallel to the elongate nose assembly and is positioned rearward relative to the delivery position, and wherein the collar cartridge is biased toward the delivery position;
   wherein the mounting bracket defines a cartridge bore;
   wherein the collar cartridge comprises an elongate body having a longitudinal axis, wherein the elongate body extends through the cartridge bore of the mounting bracket;
   wherein one of the cartridge bore and the elongate body comprises one or more channels, wherein each of the one or more channels comprises a forward elongate section parallel to the longitudinal axis, a rearward elongate section parallel to the longitudinal axis spaced longitudinally rearward of the forward elongate section and radially about the longitudinal axis relative to the forward elongate section, and a step section that interconnects the forward elongate section and the rearward elongate section;
   wherein the other of the cartridge bore and the elongate body comprises one or more pins, wherein each pin of the one or more pins extends into a respective channel of the one or more channels and is configured to operatively translate along the respective channel from the rearward elongate section to the step section to the forward elongate section when the collar cartridge moves from the delivery position to the retracted position; and
   wherein when the mounting bracket is operatively coupled to the lockbolt installation tool, the workpiece engagement surface engages the workpiece, and the lockbolt installation tool is urged toward the workpiece, the collar cartridge moves from the delivery position to the retracted position and the terminal lockbolt collar is retained on the lockbolt pin.

2. The lockbolt collar feed mechanism of claim 1, wherein the elongate body defines an internal bore that is sized to hold the plurality of lockbolt collars in single file, wherein the elongate body has a first portion and a second portion that extends at an angle relative to the first portion, and wherein the second portion includes the exit port.

3. The lockbolt collar feed mechanism of claim 2, wherein the pivot axis is coaxial with the longitudinal axis of the first portion of the elongate body.

4. The lockbolt collar feed mechanism of claim 2, wherein the mounting bracket is configured to be operatively coupled to the lockbolt installation tool to position the first portion of the elongate body parallel to the elongate nose assembly of the lockbolt installation tool.

5. The lockbolt collar feed mechanism of claim 2, wherein the workpiece engagement surface is positioned forward of the second portion relative to the first portion.

6. The lockbolt collar feed mechanism of claim 2, wherein the workpiece engagement surface has a surface area less than a perpendicular cross-sectional area of the first portion.

7. The lockbolt collar feed mechanism of claim 1, wherein the workpiece engagement surface is curved.

8. The lockbolt collar feed mechanism of claim 1, further comprising:
   a collar bias mechanism operatively coupled to the collar cartridge, wherein the collar bias mechanism is configured to urge the plurality of lockbolt collars toward the exit port.

9. The lockbolt collar feed mechanism of claim 8, wherein the collar bias mechanism comprises a spring supported by the collar cartridge.

10. The lockbolt collar feed mechanism of claim 8, wherein the collar bias mechanism comprises a source of pressurized air.

11. The lockbolt collar feed mechanism of claim 1, wherein the exit port is configured to at least temporarily retain the terminal lockbolt collar for placement onto the lockbolt pin by the user and to permit the terminal lockbolt collar to be withdrawn from the exit port responsive to the collar cartridge pivoting about the pivot axis when the collar cartridge moves from the delivery position toward the retracted position.

12. The lockbolt collar feed mechanism of claim 1, wherein the mounting bracket is configured to be operatively coupled to the elongate nose assembly of the lockbolt installation tool.

13. The lockbolt collar feed mechanism of claim 1, wherein the one or more channels comprises a plurality of channels radially spaced about the longitudinal axis.

14. The lockbolt collar feed mechanism of claim 1 in combination with the lockbolt installation tool, wherein the mounting bracket is operatively coupled to the lockbolt installation tool.

15. A lockbolt collar feed mechanism for use with a lockbolt installation tool that has an elongate nose assembly having an anvil at a distal end region of the elongate nose assembly for swaging a lockbolt collar on a corresponding lockbolt pin, the lockbolt collar feed mechanism comprising:
   a mounting bracket configured to be operatively coupled to the lockbolt installation tool; and
   a collar cartridge operatively coupled to the mounting bracket and configured to hold a plurality of lockbolt collars, wherein the collar cartridge includes an exit port configured to position a terminal lockbolt collar of the plurality of lockbolt collars for selective placement onto a lockbolt pin by a user of the lockbolt installation tool and the lockbolt collar feed mechanism, wherein the collar cartridge includes a workpiece engagement surface positioned to face and engage a workpiece when using the lockbolt installation tool and the lockbolt collar feed mechanism, wherein the collar cartridge has a delivery position and a retracted position, wherein in the delivery position, the exit port is positioned to position the terminal lockbolt collar forward of the anvil for selective placement of the terminal lockbolt collar onto the lockbolt pin by the user, wherein in the retracted position, the collar cartridge is pivoted relative to the delivery position about a pivot axis that is parallel to the elongate nose assembly and is positioned rearward relative to the delivery position, and wherein the collar cartridge is biased toward the delivery position;
wherein the mounting bracket defines a cartridge bore;
wherein the collar cartridge comprises an elongate body having a longitudinal axis, wherein the elongate body extends through the cartridge bore of the mounting bracket;
wherein one of the cartridge bore and the elongate body comprises one or more ridges, wherein each of the one or more ridges comprises a forward elongate section parallel to the longitudinal axis, a rearward elongate section parallel to the longitudinal axis spaced longitudinally rearward of the forward elongate section and radially about the longitudinal axis relative to the forward elongate section, and a step section that interconnects the forward elongate section and the rearward elongate section;
wherein the other of the cartridge bore and the elongate body comprises one or more followers, wherein each follower of the one or more followers engages a respective ridge of the one or more ridges and is configured to operatively translate along the respective ridge from the rearward elongate section to the step section to the forward elongate section when the collar cartridge moves from the delivery position to the retracted position; and
wherein when the mounting bracket is operatively coupled to the lockbolt installation tool, the workpiece engagement surface engages the workpiece, and the lockbolt installation tool is urged toward the workpiece, the collar cartridge moves from the delivery position to the retracted position and the terminal lockbolt collar is retained on the lockbolt pin.

16. The lockbolt collar feed mechanism of claim 15, wherein the one or more ridges comprises a plurality of ridges radially spaced about the longitudinal axis.

17. The lockbolt collar feed mechanism of claim 15, wherein the elongate body defines an internal bore that is sized to hold the plurality of lockbolt collars in single file, wherein the elongate body has a first portion and a second portion that extends at an angle relative to the first portion, and wherein the second portion includes the exit port.

18. The lockbolt collar feed mechanism of claim 17, wherein the pivot axis is coaxial with the longitudinal axis of the first portion of the elongate body.

19. The lockbolt collar feed mechanism of claim 17, wherein the mounting bracket is configured to be operatively coupled to the lockbolt installation tool to position the first portion of the elongate body parallel to the elongate nose assembly of the lockbolt installation tool.

20. The lockbolt collar feed mechanism of claim 17, wherein the workpiece engagement surface is positioned forward of the second portion relative to the first portion.

21. The lockbolt collar feed mechanism of claim 17, wherein the workpiece engagement surface has a surface area less than a perpendicular cross-sectional area of the first portion.

22. The lockbolt collar feed mechanism of claim 15, wherein the workpiece engagement surface is curved.

23. The lockbolt collar feed mechanism of claim 15, further comprising:
a collar bias mechanism operatively coupled to the collar cartridge, wherein the collar bias mechanism is configured to urge the plurality of lockbolt collars toward the exit port.

24. The lockbolt collar feed mechanism of claim 23, wherein the collar bias mechanism comprises a spring supported by the collar cartridge.

25. The lockbolt collar feed mechanism of claim 23, wherein the collar bias mechanism comprises a source of pressurized air.

26. The lockbolt collar feed mechanism of claim 15, wherein the exit port is configured to at least temporarily retain the terminal lockbolt collar for placement onto the lockbolt pin by the user and to permit the terminal lockbolt collar to be withdrawn from the exit port responsive to the collar cartridge pivoting about the pivot axis when the collar cartridge moves from the delivery position toward the retracted position.

27. The lockbolt collar feed mechanism of claim 15, wherein the mounting bracket is configured to be operatively coupled to the elongate nose assembly of the lockbolt installation tool.

28. The lockbolt collar feed mechanism of claim 15 in combination with the lockbolt installation tool, wherein the mounting bracket is operatively coupled to the lockbolt installation tool.

29. A method of installing a lockbolt assembly on a workpiece, the method comprising:
providing the combination of claim 14, wherein the plurality of lockbolt collars is held by the collar cartridge;
inserting a first lockbolt pin through a first hole in the workpiece;
positioning the combination so that a first terminal lockbolt collar of the plurality of lockbolt collars is inserted onto the first lockbolt pin and so that the first lockbolt pin extends into the elongate nose assembly of the lockbolt installation tool;
engaging the workpiece engagement surface against the workpiece;
urging the lockbolt installation tool toward the workpiece so that the collar cartridge pivots about the pivot axis and releases the first terminal lockbolt collar from the exit port and so that the collar cartridge translates rearward relative to the mounting bracket; and
activating the lockbolt installation tool to swage the first terminal lockbolt collar on the first lockbolt pin.

30. A method of installing a lockbolt assembly on a workpiece, the method comprising:
providing the combination of claim 28, wherein the plurality of lockbolt collars is held by the collar cartridge;
inserting a first lockbolt pin through a first hole in the workpiece;

positioning the combination so that a first terminal lockbolt collar of the plurality of lockbolt collars is inserted onto the first lockbolt pin and so that the first lockbolt pin extends into the elongate nose assembly of the lockbolt installation tool;

engaging the workpiece engagement surface against the workpiece;

urging the lockbolt installation tool toward the workpiece so that the collar cartridge pivots about the pivot axis and releases the first terminal lockbolt collar from the exit port and so that the collar cartridge translates rearward relative to the mounting bracket; and activating the lockbolt installation tool to swage the first terminal lockbolt collar on the first lockbolt pin.

\* \* \* \* \*